US009752702B2

(12) United States Patent
Yamamoto et al.

(10) Patent No.: US 9,752,702 B2
(45) Date of Patent: Sep. 5, 2017

(54) VALVE FOR ABNORMAL LIQUID

(71) Applicant: FUMOTO GIKEN CO., LTD., Miura-gun, Kanagawa (JP)

(72) Inventors: Ryohei Yamamoto, Miura-gun (JP); Yuho Yamamoto, Miura-gun (JP); Naoyuki Yamamoto, Miura-gun (JP)

(73) Assignee: FUMOTO GIKEN CO., LTD., Miura-gun (JP)

( * ) Notice: Subject to any disclaimer, the term of this patent is extended or adjusted under 35 U.S.C. 154(b) by 24 days.

(21) Appl. No.: 14/726,338

(22) Filed: May 29, 2015

(65) Prior Publication Data

US 2015/0345659 A1   Dec. 3, 2015

(30) Foreign Application Priority Data

May 29, 2014   (JP) .................................. 2014-111119
Jan. 27, 2015   (JP) .................................. 2015-013553

(51) Int. Cl.
| | |
|---|---|
| F16K 5/06 | (2006.01) |
| F16K 37/00 | (2006.01) |
| E03B 7/12 | (2006.01) |
| F16K 39/06 | (2006.01) |
| F16K 5/08 | (2006.01) |

(52) U.S. Cl.
CPC .............. *F16K 39/06* (2013.01); *E03B 7/12* (2013.01); *F16K 5/06* (2013.01); *F16K 5/0642* (2013.01); *F16K 5/0647* (2013.01); *F16K 5/08* (2013.01); *F16K 37/0075* (2013.01); *Y10T 137/0318* (2015.04); *Y10T 137/1189* (2015.04)

(58) Field of Classification Search
CPC ................................................ Y10T 137/1189

USPC .......................................................... 137/59
See application file for complete search history.

(56) References Cited

U.S. PATENT DOCUMENTS

| | | |
|---|---|---|
| D56,925 S | 1/1921 | Humphrey |
| D56,926 S | 1/1921 | Humphrey |
| 1,973,418 A | 9/1934 | Sibley |
| 2,035,762 A | 3/1936 | Roberts |
| 2,118,232 A | 5/1938 | Roberts |
| 2,121,553 A | 6/1938 | Stewawrt et al. |
| 2,194,714 A | 3/1940 | Mueller |

(Continued)

FOREIGN PATENT DOCUMENTS

| | | |
|---|---|---|
| CH | 163683 A | 8/1933 |
| DE | 102015209919 A1 | 3/2015 |

(Continued)

OTHER PUBLICATIONS

Fumoto Giken Co., Ltd., Publication of US trademark application No. 85/837,373, Published on Apr. 22, 2014.

(Continued)

*Primary Examiner* — Mary McManmon
*Assistant Examiner* — Richard K Durden
(74) *Attorney, Agent, or Firm* — Masuvalley & Partners

(57) ABSTRACT

An operating valve includes a valve chamber which is formed in a main body having a passage, a valve body which is housed in the valve chamber and has a passage corresponding to the passage of the main body, a rotary shaft which is detachably connected to the valve body, an operating member which operates a rotation of the rotary shaft, and a bias member which biases the rotary shaft to a position of the valve body.

4 Claims, 14 Drawing Sheets

(56) References Cited

U.S. PATENT DOCUMENTS

| | | | |
|---|---|---|---|
| 2,665,879 A | 1/1954 | Housekeeper et al. | |
| 2,691,988 A | 10/1954 | Weatherhead, Jr. | |
| 3,112,758 A | 12/1963 | Norton | |
| 3,443,789 A | 5/1969 | Glasgow et al. | |
| 3,623,698 A | 11/1971 | Couper et al. | |
| 3,726,503 A * | 4/1973 | Fawkes | F16K 1/2285 251/173 |
| 3,764,102 A | 10/1973 | Shopsky | |
| 3,954,250 A | 5/1976 | Grace | |
| 4,078,763 A * | 3/1978 | Yamamoto | F16K 5/0647 137/315.2 |
| 4,380,247 A | 4/1983 | Douglas | |
| D297,354 S | 8/1988 | Wirth | |
| 4,964,614 A * | 10/1990 | Sands | F16K 5/0647 251/309 |
| 5,072,913 A | 12/1991 | Carroll | |
| 5,275,200 A * | 1/1994 | Yamamoto | F16K 5/0647 137/315.18 |
| D375,141 S | 10/1996 | Valley | |
| 6,325,355 B1 | 12/2001 | Johnson | |
| D455,818 S | 4/2002 | Naoyuki | |
| 6,371,155 B1 | 4/2002 | Balocca | |
| D500,123 S | 12/2004 | Pelletz | |
| D505,184 S | 5/2005 | Trappa | |
| D516,678 S | 3/2006 | Tripp et al. | |
| 7,226,285 B2 | 6/2007 | Tsai | |
| 7,849,877 B2 | 12/2010 | Tan et al. | |
| 8,327,867 B2 * | 12/2012 | Caleffi | E03B 7/12 137/62 |
| D681,170 S | 4/2013 | Yamamoto | |
| D681,171 S | 4/2013 | Yamamoto | |
| D701,945 S | 4/2014 | Mitsuoka | |
| D701,946 S | 4/2014 | Mitsuoka | |
| D730,491 S | 5/2015 | Yamamoto et al. | |
| 2003/0205687 A1 | 11/2003 | McPeak et al. | |
| 2006/0191960 A1 | 8/2006 | Shelton | |
| 2007/0163654 A1 | 7/2007 | Elliott | |
| 2010/0313966 A1 * | 12/2010 | Murg | B64D 11/02 137/59 |
| 2014/0124056 A1 | 5/2014 | Zeyfang | |
| 2015/0041689 A1 | 2/2015 | Rucinski | |
| 2015/0345659 A1 | 12/2015 | Yamamoto et al. | |

FOREIGN PATENT DOCUMENTS

| | | | |
|---|---|---|---|
| GB | 473048 A | 10/1937 | |
| GB | 521848 A | 6/1940 | |
| GB | 526708 A | 9/1940 | |
| GB | 1173090 A * | 12/1969 | F16K 5/06 |
| GB | 1222210 A | 2/1971 | |
| IT | EP 2110589 A2 * | 10/2009 | E03B 7/10 |
| JP | S49-38917 Y | 10/1974 | |
| JP | S59-113374 A | 6/1984 | |
| JP | S59-113375 A | 6/1984 | |
| JP | S59-147171 A | 8/1984 | |
| JP | S59-231274 A | 12/1984 | |
| JP | S60-260773 A | 12/1985 | |
| JP | 837859 S | 5/1992 | |
| JP | H05-79137 U | 10/1993 | |
| JP | H05-83560 U | 11/1993 | |
| JP | 837859 S | 4/1995 | |
| JP | 2546566 Y2 | 5/1997 | |
| JP | 2546566 Y2 | 9/1997 | |
| JP | D1113929 S | 7/2001 | |
| JP | 2002-106731 A | 4/2002 | |
| JP | 2005-233395 A | 9/2005 | |
| JP | 2015-161337 A | 9/2015 | |
| JP | 2016-6346 A | 1/2016 | |

OTHER PUBLICATIONS

Fumoto Giken Co., Ltd., Publication of US trademark application No. 85/828,222, Published on Apr. 22, 2014.

* cited by examiner

US 9,752,702 B2

VALVE FOR ABNORMAL LIQUID

This application claims priority under 35 U.S.C. §119 from Japanese patent application Serial No. 2014-111119, filed May 29, 2014 and Japanese patent application Serial No. 2015-013553, filed Jan. 27, 2015, which are incorporated herein by reference in its entirety.

TECHNICAL FIELD

The present invention relates to an opening/closing valve for abnormal liquid. More specifically, the present invention relates to the opening/closing valve for abnormal liquid which is mounted to a flow passageway of the abnormal liquid, and is used for regulating the flow and the interception of the abnormal liquid by opening/closing the valve.

BACKGROUND

Conventionally, an opening/closing valve is mounted to a passage through which liquid flows for regulating the flow of the liquid. Such opening/closing valves have various structures, and for instance, there is a ball type valve with a spherical valve body as described in Japanese Utility Model Registration No. 2546566. This ball valve has a spherical valve body, a stem (operating shaft), for a rotational operation of the valve body, connected to the valve body, and a passage provided through the center of the valve body by boring in the direction perpendicular to the stem. The passage of the valve body can be switched between an open state where the passage of the valve body is corresponding to a flow passageway formed in a main body of the ball valve, and a closed state where the passage is perpendicular to the flow passageway.

Such a ball valve is provided with sealing members, which adhere to the outer peripheral surface of the valve body that is to be rotationally operated, at both of the upstream and the downstream sides of the valve body. In the closed state, high sealing efficiency is achieved by sealing the valve body with both of the seal members. Incidentally, such a ball valve as described above has a valve chamber for accommodating the spherical shaped valve body in the main body, and there is a gap between the valve body and the valve chamber. When the valve body is in the closed state, the passage formed in the valve body communicates with a space inside the valve chamber, and the space formed by the valve chamber and the passage is filled with the fluid that has communicated.

SUMMARY OF THE INVENTION

In such a closed state, if kept in a low temperature environment, any liquid remaining in the valve chamber and the passage may get frozen. In such a case, if the liquid is an abnormal liquid, the volume of the remaining liquid expands and consequently pushes out the seal members from inside, and thereby decreasing the sealing effect. Otherwise, there were cases where other parts got crushed from behind and this caused break-downs.

The first objective of the present invention is to provide an opening/closing valve for abnormal liquid which can maintain the sealing effect of sealing members even if the abnormal liquid present in a valve chamber freezes. Further, the second objective of the present invention is to provide an opening/closing valve which can prevent abnormal liquid from entering a space between a valve body and an inner surface of a valve chamber, and to provide a method for preventing abnormal liquid from entering the valve chamber.

The first objective is accomplished by the following inventions.

(1) A valve for abnormal liquid, including:
a main body which includes a connecting part to be detachably mounted to a flow passageway of the abnormal liquid, and a passage communicating with the flow passageway of the abnormal liquid at the time of mounting;
a valve chamber which is formed in the main body and has a hole corresponding to the passage;
a valve body which is housed in the valve chamber and has a passage corresponding to the passage of the main body, the valve body performing switching operation by rotating with respect to the passage of the main body;
a seal member which prevents the abnormal liquid that is present in the passage of the main body from entering the valve chamber when the passage of the valve body corresponds to the passage of the main body;
a rotary shaft which is housed in the main body, the rotary shaft being connected to the valve body at least in a state where the abnormal liquid is not frozen, and being connected so as to be movable in an axial direction;
an operating member which is connected to the rotary shaft in the main body and projects outside the main body, the operating member operating a rotation of the rotary shaft; and
a bias member which biases the rotary shaft to a position of the valve body.

(2) A valve for abnormal liquid according to (1), further including a display unit which displays a status of a freeze so as to be able to be checked from outside of the main body by displaying a movement of the rotary shaft.

In the valve for abnormal liquid according to (1), the main body has a connecting part to be detachably mounted to a flow passageway of the abnormal liquid, and a passage communicating with the flow passageway at the time of mounting.

A valve chamber is formed in the main body, and a valve body is housed in the valve chamber. The valve body has a passage corresponding to the passage of the main body.

A seal member prevents the abnormal liquid that is present in the passage of the main body from entering the valve chamber when the passage of the valve body corresponds to the passage of the main body.

A rotary shaft which is housed in the main body is connected to the valve body. An operating member is connected to the rotary shaft in the main body and projects outside the main body. The operating member operates a rotation of the rotary shaft. If the operating member operates a rotation of the rotary shaft and the valve body connected to the rotary shaft is located at a position which is corresponding to the passage of the main body, the abnormal liquid contained in the abnormal liquid container will be discharged to outside through the passages of the main body and the valve body. If the operating member operates a rotation of the rotary shaft and the valve body connected to the rotary shaft is located at a position which is not corresponding to the passage of the main body, the passage of the main body is shut by the valve body, and the abnormal liquid in the flow passageway of the abnormal liquid will not flow through the flow passageway. Thus, the valve body performs the opening/closing operation by rotating with respect to the passage of the main body.

A bias member biases the rotary shaft to a position of the valve body. When the valve body rotates, the abnormal liquid present in the passage of the main body enters a space between the inner surface of the valve chamber and the valve body. If the abnormal liquid, which has entered the space between the inner surface of the valve chamber and the valve body, freezes and results in volume expansion, the rotary shaft, which is movably connected to the valve body, overcomes the bias of the biasing member because of the expanded volume of the abnormal liquid and moves in a direction of separating away from the valve body. Thus, even if the abnormal liquid which has entered the space between the valve body and the inner surface of the valve chamber expands in volume due to freezing, since the rotary shaft moves in a direction of separating away from the valve body, it becomes possible to prevent pressure from applying to the seal members in a direction of pushing the seal members out of the valve chamber. Since the seal members do not deform or break, it becomes possible to maintain the sealing effect of the seal members.

In (2), since the movement of the rotary shaft signifies freezing, it will be possible to check if the inside abnormal liquid is frozen or not with the help of a display means to display a movement of the rotary shaft.

The second objective mentioned above is accomplished by the following inventions.

(3) A valve for abnormal liquid, including:

a main body which includes a connecting part detachably mounted to a flow passageway of the abnormal liquid, and a passage communicating with the flow passageway of the abnormal liquid at the time of mounting;

a valve chamber which is formed in the main body, the valve chamber having a hole corresponding to the passage and a hole communicating with an outside;

a valve body which is housed in the valve chamber and has a passage corresponding to the passage of the main body, the valve body performing switching operation by rotating with respect to the passage of the main body;

a rotary shaft which is connected to the valve body and housed in the main body;

an operating member which is connected to the rotary shaft in the main body and projects outside the main body, and the operating member operating a rotation of the rotary shaft; and a resin which is poured from the hole communicating with the outside into a space between an inner surface of the valve chamber and the valve body.

(4) A valve for abnormal liquid according to (3), wherein a release agent is applied to a surface of the valve body.

(5) A method of preventing entry of abnormal liquid into a valve chamber of a valve for preventing the abnormal liquid present in a passage of a main body or a valve body from entering the valve chamber, the valve including:

a main body which includes a connecting part detachably mounted to a flow passageway of the abnormal liquid, and a passage communicating with the flow passageway of the abnormal liquid at the time of mounting;

a valve chamber which is formed in the main body, the valve chamber having a hole corresponding to the passage and a hole communicating with an outside;

a valve body which is housed in the valve chamber and has a passage corresponding to the passage of the main body, the valve body performing switching operation by rotating with respect to the passage of the main body;

a rotary shaft which is connected to the valve body and housed in the main body; and an operating member which is connected to the rotary shaft in the main body and projects outside the main body, the operating member operating a rotation of the rotary shaft;

the method including the step of:

pouring a resin from the hole communicating with the outside into a space between an inner surface of the valve chamber and the valve body.

(6) The method for preventing entry of abnormal liquid into a valve chamber according to (5), wherein a release agent is applied to a surface of the valve body.

(7) A valve for abnormal liquid, including:

a main body which includes a connecting part detachably mounted to a flow passageway of the abnormal liquid, and a passage communicating with the flow passageway of the abnormal liquid at the time of mounting;

a valve chamber which is formed in the main body and has a hole corresponding to the passage;

a valve body which is housed in the valve chamber and has a passage corresponding to the passage of the main body, the valve body performing switching operation by rotating with respect to the passage of the main body;

a rotary shaft which is connected to the valve body and housed in the main body;

an operating member which is connected to the rotary shaft in the main body and projects outside the main body, the operating member operating a rotation of the rotary shaft; and a seal member which is formed to fill in a space between an inner surface of the valve chamber and the valve body, and which prevents the abnormal liquid present in the passage of the main body from entering the valve chamber.

In (3)-(6), a hole communicating with an outside is provided in the valve chamber. Since a resin is poured from the hole communicating with the outside into a space between an inner surface of the valve chamber and the valve body, the abnormal liquid can be prevented from entering the space between the valve body and the inner surface of the valve chamber.

In (4) and (6), since a release agent is applied to a surface of the valve body, it becomes possible to minimize a coefficient of friction between the valve body and the resin, and thereby the valve body can be easily rotated.

In (7), by forming a seal member to fill in a space between the inner surface of the valve chamber and the valve body, the abnormal liquid present in the passage of the main body is prevented from entering the valve chamber.

The invention according to claim 1 has an effect of maintaining the sealing efficiency of the seal member even if abnormal liquid present in the valve chamber freezes.

The invention according to claim 2 has an effect of being able to check from outside whether the abnormal liquid inside the valve chamber is frozen or not.

The invention according to claim 3 has an effect of preventing the abnormal liquid from entering the space between the valve body and the inner surface of the valve chamber.

The invention according to claim 4 has an effect of being able to make a coefficient of friction between the valve body and the resin small, and to facilitate a rotary operation of the valve body.

The invention according to claim 5 has an effect of preventing the abnormal liquid from entering the space between the valve body and the inner surface of the valve chamber.

The invention according to claim 6 has an effect of being able to make a coefficient of friction between the valve body and the resin small, and to facilitate a rotary operation of the valve body.

The invention according to claim 7 has an effect of preventing the abnormal liquid from entering the space between the valve body and the inner surface of the valve chamber.

DETAILED DESCRIPTION OF THE INVENTION

One example of an embodiment of the disclosed art is explained below in detail with reference to figures.

Figure 1:
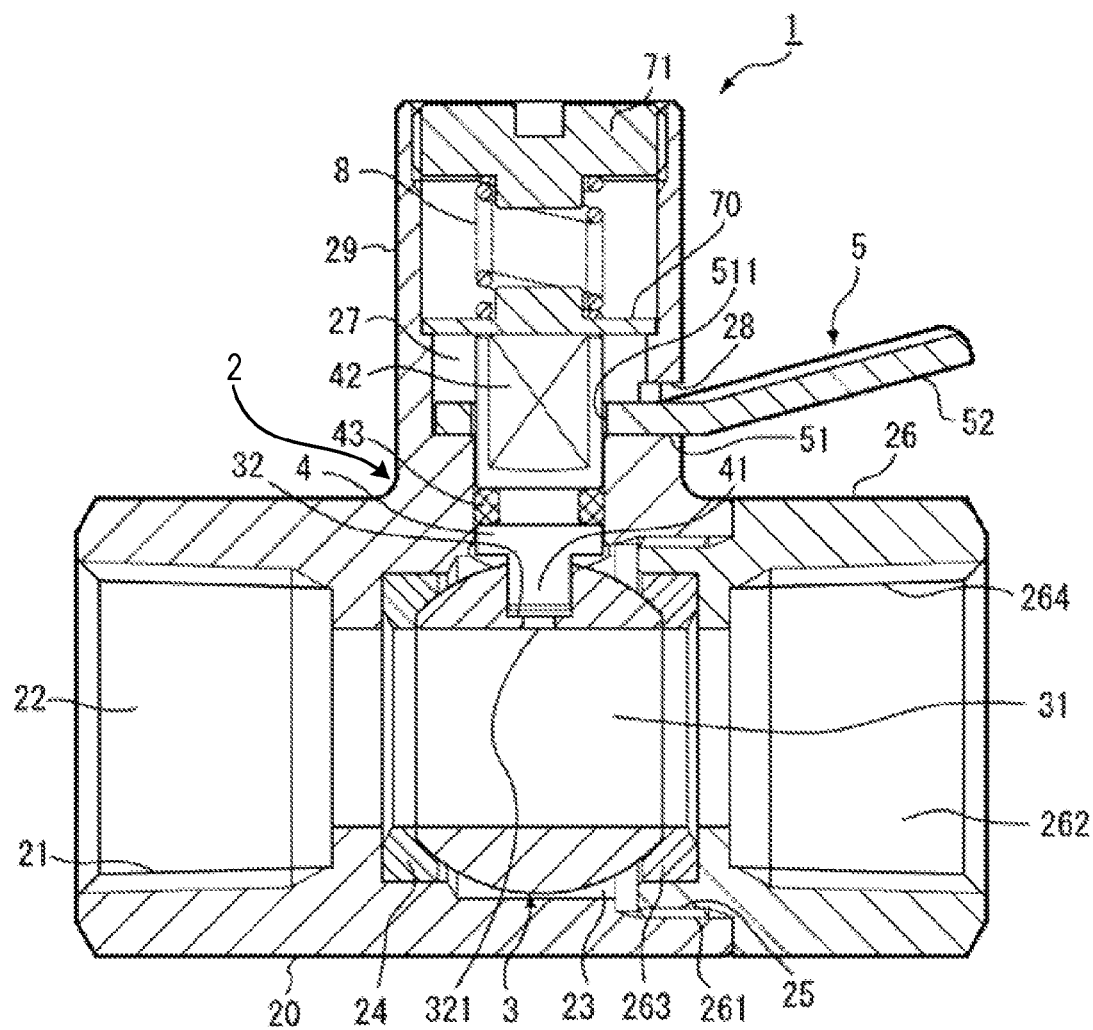
FIG. 1 is a cross-sectional side view of an operating valve of the first embodiment in the open state.
Figure 2:
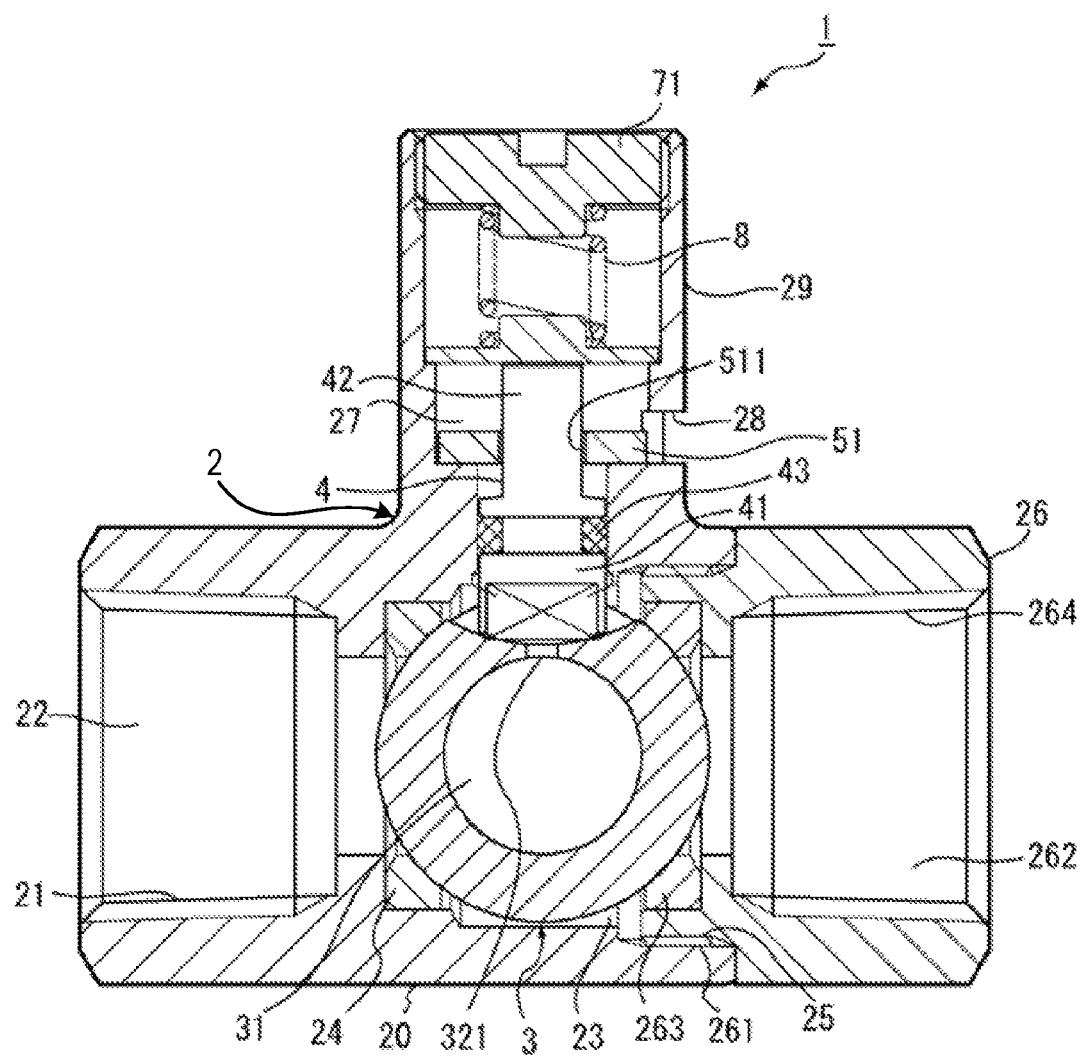
FIG. 2 is a cross-sectional side view of an operating valve in the closed state.
Figure 3:
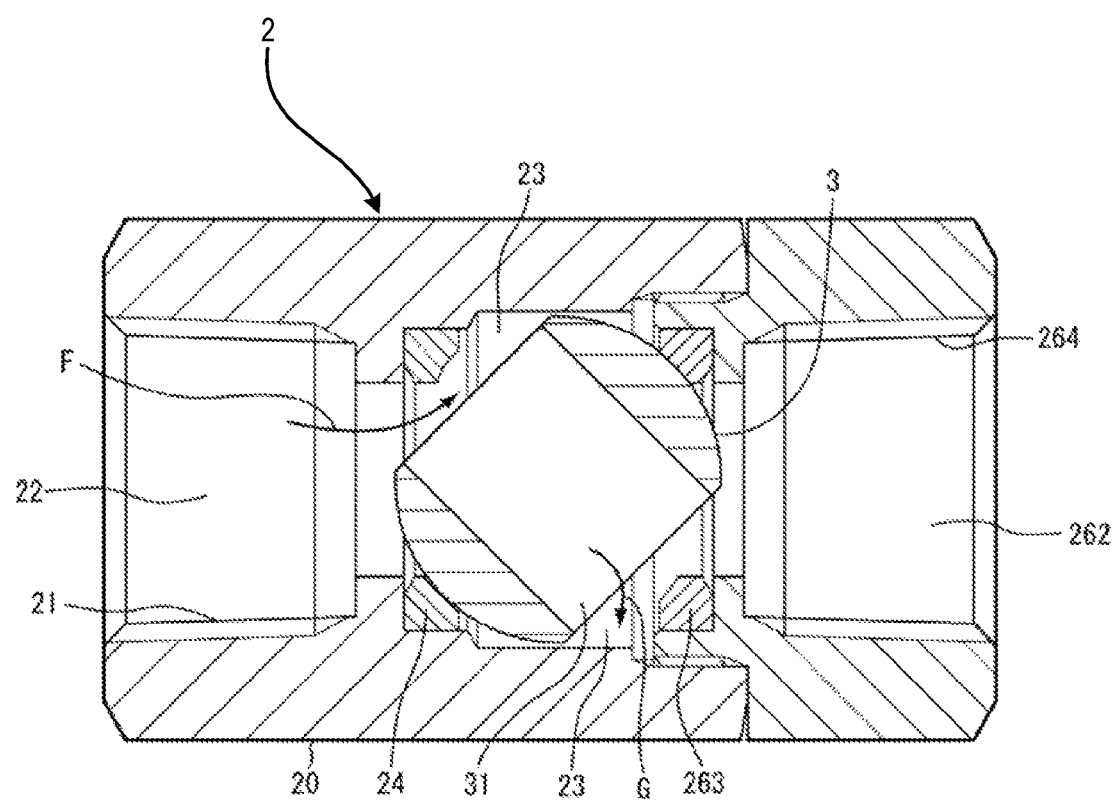
FIG. 3 shows a situation, as seen from the top sides of FIG. 1 and FIG. 2, where abnormal liquid enters a space between a valve body and an inner surface of a valve chamber.
Figure 4:
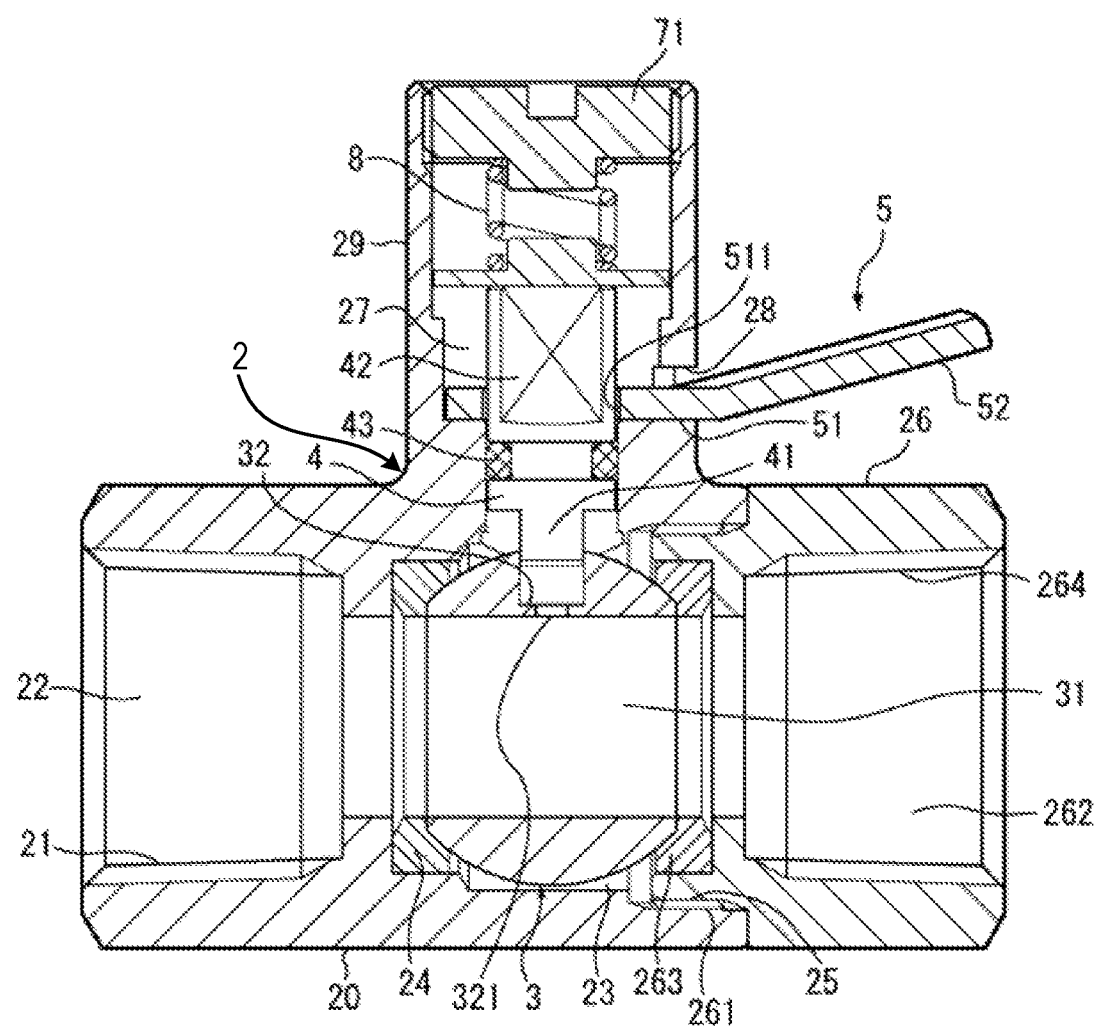
FIG. 4 is a cross-sectional side view of an operating valve in the open state, showing a situation where a rotary shaft has moved in the axial direction because of the expanded volume of the abnormal liquid present in the valve chamber due to freezing.
Figure 5:
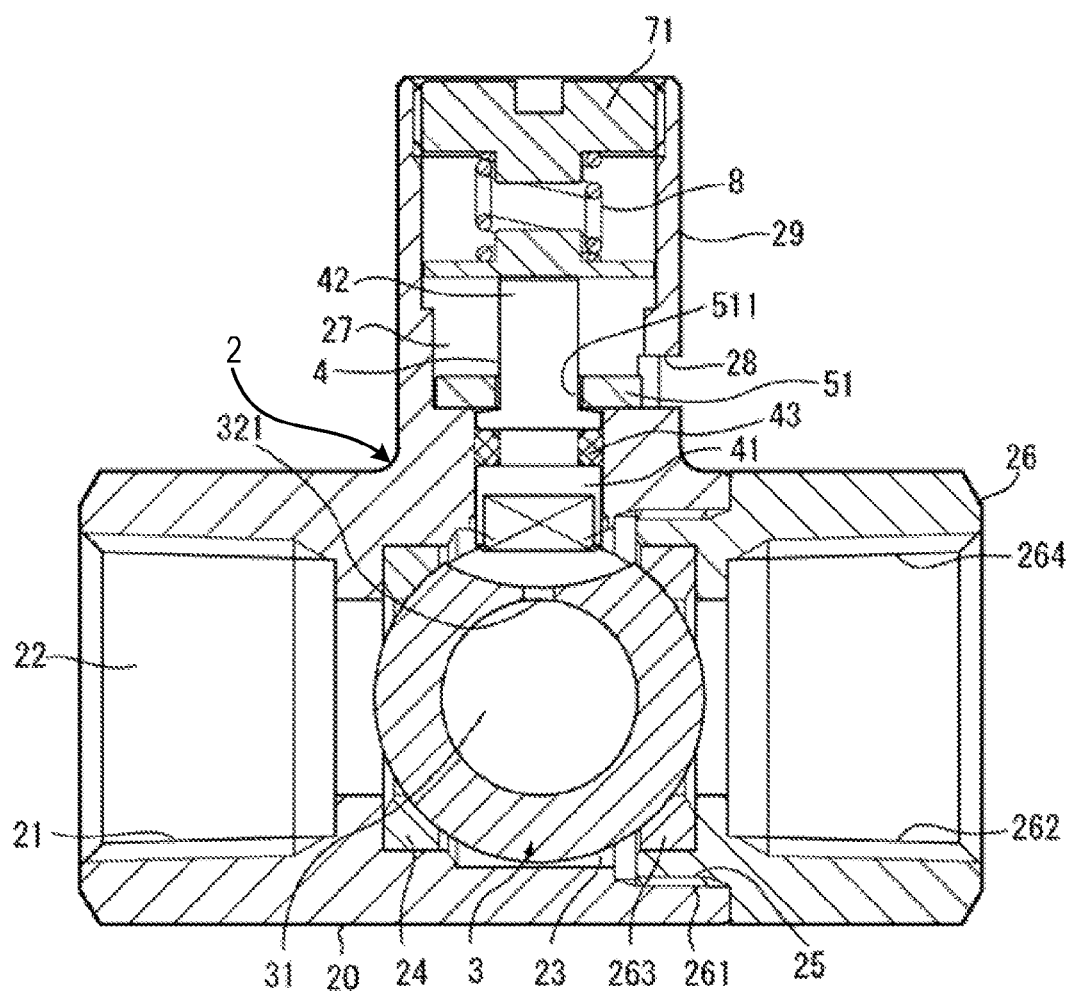
FIG. 5 is a cross-sectional side view of an operating valve in the closed state, showing a situation where the rotary shaft has moved in the axial direction because of the expanded volume of the abnormal liquid present in the valve chamber due to freezing.

The first embodiment is described as follows. FIGS. 1-5 show an operating valve of the first embodiment. FIG. 1 is a cross-sectional side view of an operating valve 1 in an open state. FIG. 2 is a cross-sectional side view of the operating valve 1 in a closed state. FIG. 3 shows a situation, as seen from the top sides of FIG. 1 and FIG. 2, where abnormal liquid enters a space between a valve body and an inner surface of a valve chamber. FIG. 4 is a cross-sectional side view of the operating valve in the open state, showing a situation where a rotary shaft has moved in the axial direction because of the expanded volume of the abnormal liquid present at the valve chamber due to freezing. FIG. 5 is a cross-sectional side view of the operating valve in the closed state, showing a situation where the rotary shaft has moved in the axial direction because of the expanded volume, due to freezing, of the abnormal liquid present in the valve chamber.

The operating valve 1 has a main body 2, a valve body 3 which is housed in the main body 2, and an operating member 5 which opens/closes the valve body 3. The main body 2 has a connecting body 20 which is connected to a passage, and a holder 29 which extends in the perpendicular direction to the connecting body 20. The connecting body 20 is provided with a connecting part 21 where a helical thread shape is formed on the cylindrical inner peripheral surface. This connecting part 21 is formed so as to be mounted to an outlet of a holder of liquid (abnormal liquid) such as water, which expands its volume due to freezing (freezing expansion).

A passage 22 is formed in the connecting part 21. This passage 22 has an open end at an edge of the connecting part 21 so as to communicate with an inside of a holder of abnormal liquid such as abnormal liquid pan (or to communicate with a flow passage tube) when the connecting part 21 is screwed to an outlet, and the like. The other end of the passage 22 communicates with a valve chamber 23 formed inside the connecting body 20. At the edge of the passage 22 near the valve chamber 23, a ring-shaped seal member 24, which is inserted between a valve body 3 is attached. The valve body 3 is described later.

A spherical valve body 3 is housed in the valve chamber 23. The valve body 3 has a passage 31, at its center part, which is to be connected to the passage 22. The passage 31 has the same diameter as the passage 22, and is formed in the same direction as the passage 22. At the opposite side of valve body 3 with respect to the passage 22, the valve chamber 23 opens outwardly. On the inner peripheral surface of the open end of the valve chamber, a helical threaded screw part 25 is formed. In the open end of the valve chamber, a cover member 26 is screwed from the outside, and the inside valve body 3 is maintained so as to be able to slidably rotate.

The cover member 26 is provided with a screw part 261 that is engaged with the open end of the valve chamber. Similar to the connecting part 21, the cover member 26 has a passage 262 at its center, and a female screw 264 as a connecting part is formed in the inner peripheral surface of the passage 262. The passage which penetrates through the inside of the operating valve 1 is formed by the passages 22, 31, and 262. For example, a flow passageway tube, which configures a passage, can be connected to the passage 22 and the passage 262, and the valve according to the present invention can be used as a switching valve for regulating the flow of liquid present in the passage. At the end of the passage 262 near the valve body, a ring-shaped seal member 263 is provided, and the ring-shaped seal member 263 slidably contacts with the outer peripheral surface of the valve body 3.

In the valve chamber 23, the valve body 3 is maintained so as to be able to rotate around a rotary shaft which is a perpendicular direction to the passages 22 and 262. As shown in FIG. 1, when the passage 31 of the valve body 3 is corresponding to the passages 22 and 262 of the connecting body 20, that is, the direction of the passage 31 of the valve body 3 is in the same direction as the direction of the passages 22 and 262 of the main body 2, the operating valve 1 is in an open state. On the other hand, as shown in FIG. 2, when the passage 31 is in a perpendicular direction with respect to the passages 22 and 262, the operating valve 1 is in a closed state, and abnormal liquid is not be able to flow. In the closed state, the seal members 24 and 263 contact with the spherical-shaped outer peripheral surface of the valve body 3, and prevent the leakage of the abnormal liquid. As the seal members 24 and 263 are of ring shape, the liquid sealing efficiency of the spherical surface of the valve body 3 will be excellent.

In the upper part of the figures of the valve body 3, a holder 27 is formed in the holder main body 29 to accommodate a rotary shaft 4 and an operating member 5. In the upper part of the valve body 3, a groove is formed to provide an engaging recess 32 which is connected to the rotary shaft 4. At the bottom of the engaging recess 32, a connecting hole 321 is provided to communicate with the passage 31.

First, the rotary shaft 4 of the valve body 3 is accommodated in the holder 27. At the lower end of the rotary shaft 4, an engagement projection 41 which is formed to be protruding-shaped so as to detachably engage with the engaging recess 32 of the valve body 3 is provided. Further, at the upper end of the rotary shaft 4, a prismatic connecting part 42 which is connected to an operating member 5 (described later) is provided. In the outer peripheral surface of the rotary shaft 4, a seal member 43 which slidably contacts with the inner wall of the holder 27 is embedded, and the liquid sealing efficiency of the operating valve 1 is enhanced. With the help of the seal member 43, the liquid present in the valve chamber 23 is sealed, thereby preventing its leakage to the outside.

An operating member 5 is connected to the connecting part 42 of the rotary shaft 4. The operating member 5 has a disc-shaped base end portion 51 which is connected to the rotating shaft 4, and an operating part 52 which projects outside the holder 27 and works as an operating lever. At the center of the base end portion 51, a rectangular joining hole 511 having the same shape as the cross-sectional shape of the connecting part 42 of the rotary shaft 4 is formed. A guide hole 28 is formed on the side surface of the holder 27, and the operating part 52 is inserted in the guide hole 28. Thus, the operating part 52 can slide within the range of the guide hole 28.

By inserting and connecting the connecting part 42 of the rotary shaft with a joining hole 511 of the base end portion 51, the rotary shaft 4 rotates by a slide of the operating member 5, and thereby, the valve body 3 rotates in the main body 2. The connecting direction of the operating member 5 is set so that the direction which the operating part 52 orients shows the direction of the passage 31 of the valve body 3. By having this configuration, it is possible to understand which state (open/closed) the operation valve 1 is taking by just seeing the position of the operating part 52.

A spring receiving member 70 is provided at the top of the connecting part 42 of the rotary shaft 4. The holder 27 is covered with a lid 71 so that the holder 27 is closed. A biasing member 8 made by, for example, a compression spring is inserted between the spring receiving member 70 and the lid 71. The rotary shaft 4, through the spring receiving member 70, is biased toward the direction of the valve body 3 at all times by the effect of the biasing member 8.

The guide hole 28, in which the operating part 52 of the operating member 5 is inserted, is formed in a slit shaped. The length in the longitudinal direction of the slit is defined such that the operating part 52 can slide in the range of approximately 90°. As already explained, when the operating part 52 is positioned perpendicularly with respect to the passage direction of the main body 2, the passage 31 of the valve body 3 is located in a perpendicular direction to the passages 22 and 262 of the main body 2, and the valve body is set to be the closed state.

As mentioned above, it is possible to detach the engaging recess 32 of the valve body 3 and the engagement projection 41 of the rotary shaft 4. However, the rotary shaft 4, through the spring receiving member 70, is biased toward the direction of the valve body 3 at all times by the effect of the biasing member 8. If the operating part 52 slides, consequently, the rotary shaft 4 and valve body 3 rotate.

Next, functions of the embodiments of the present invention are explained. The connecting part 21 is mounted to an outlet, and the like of a holder which stores water. In order to discharge water, the rotary shaft 4 and the valve body 3 are rotated by sliding the operating part 52 such that the closed state (FIG. 2), where the direction of the passage 22 of the main body 2 is perpendicular to the direction of the passage 31 of the valve body 3, is changed to the open state (FIG. 1), where the passage 22 of the main body 2 is corresponding to the passage 31 of the valve body 3 through a state shown in FIG. 3. Thereby, the water in the holder can be discharged to an outside through the passage 22 of the main body 2 and the passage 31 of the valve body 3.

In the open state (FIG. 1) and the closed state (FIG. 2), the valve chamber 23 is sealed by the seal members 24 and 263. However, during the transitional period from the closed state (FIG. 2) to the open state (FIG. 1) that is operated by rotating the valve body 3, for example, a time when the passage 22 of the main body 2 and the passage 31 of the valve body 3 are making an angle of 45° (FIG. 3), the valve chamber 23 is not sealed. The water present in the passage 22 of the main body 2 enters the valve chamber 23 (a space between the inner surface of the valve chamber 23 and the valve body 3) as shown in F and G. The entered water cannot leak to an outside because of the seal member 43.

In order to store additional water in the holder after the previous water is discharged, the rotary shaft 4 and valve body 3 are rotated by sliding the operating part 52 and the closed state (FIG. 2) is taken. If the water entered in the chamber 23 freezes under the condition where the passage 22 of the main body 2 and the passage 31 of the valve body 3 are in the closed state as shown in FIG. 2, the water expands its volume. Incidentally, if the valve body 3 and the rotary shaft 4 were fixed, pressure would apply to the seal members 24 and 263 in the direction where the seal members 24 and 263 are pushed out of the valve chamber 23. Due to this, the seal members 24 and 263 may break or deform, and thereby decreasing the sealing efficiency of the seal members 24 and 263.

However, as explained above, since the rotary shaft 4 is detachably connected to the valve body 3, as shown in FIG. 4 and FIG. 5, the rotary shaft 4 can overcome the bias of the biasing member 8 with the expanded volume of water and can detach from the valve body 3. Thus, even if the water which enters the space between the inner surface of the valve chamber 23 and the valve body 3 expands its volume by freezing, the rotary shaft 4 can detach from the valve body 3. It becomes possible to prevent pressure from applying to the seal members 24 and 263 in the direction where the seal member 24 and 263 are pushed out of the valve chamber 23. Without breaking or deforming the seal members 24 and 263, it becomes possible to maintain the sealing efficiency of the seal members 24 and 263. In the first embodiment, the connecting hole 321 may or may not be present.

Further, when the gap between the outer peripheral surface of the valve body 3 and the inner wall of the valve chamber 23 is small, the connecting hole 321 acts effectively. It is preferable that the connecting hole 321 is formed at the farthest location from the inner wall of the valve chamber 23, in other words, at a position closer to the rotation center axis of the rotary shaft 4. In freezing, the section which touches the main body 2 that has been cooled by the outside air, namely, the section which touches the inner wall of the valve chamber 23 begins to freeze first, and ultimately, the central portion of the space will freeze. For this reason, if the connecting hole 321 is formed at a position which is close to a location where liquid is least likely to freeze (i.e. a farthest location from the inner wall of the valve chamber 23, or a position which is close to the rotation center axis of the rotary shaft 4), it will be easy to let the expanded volume escape in the direction of the rotation axis by a movement of the liquid through the connecting hole 321.

Figure 6:
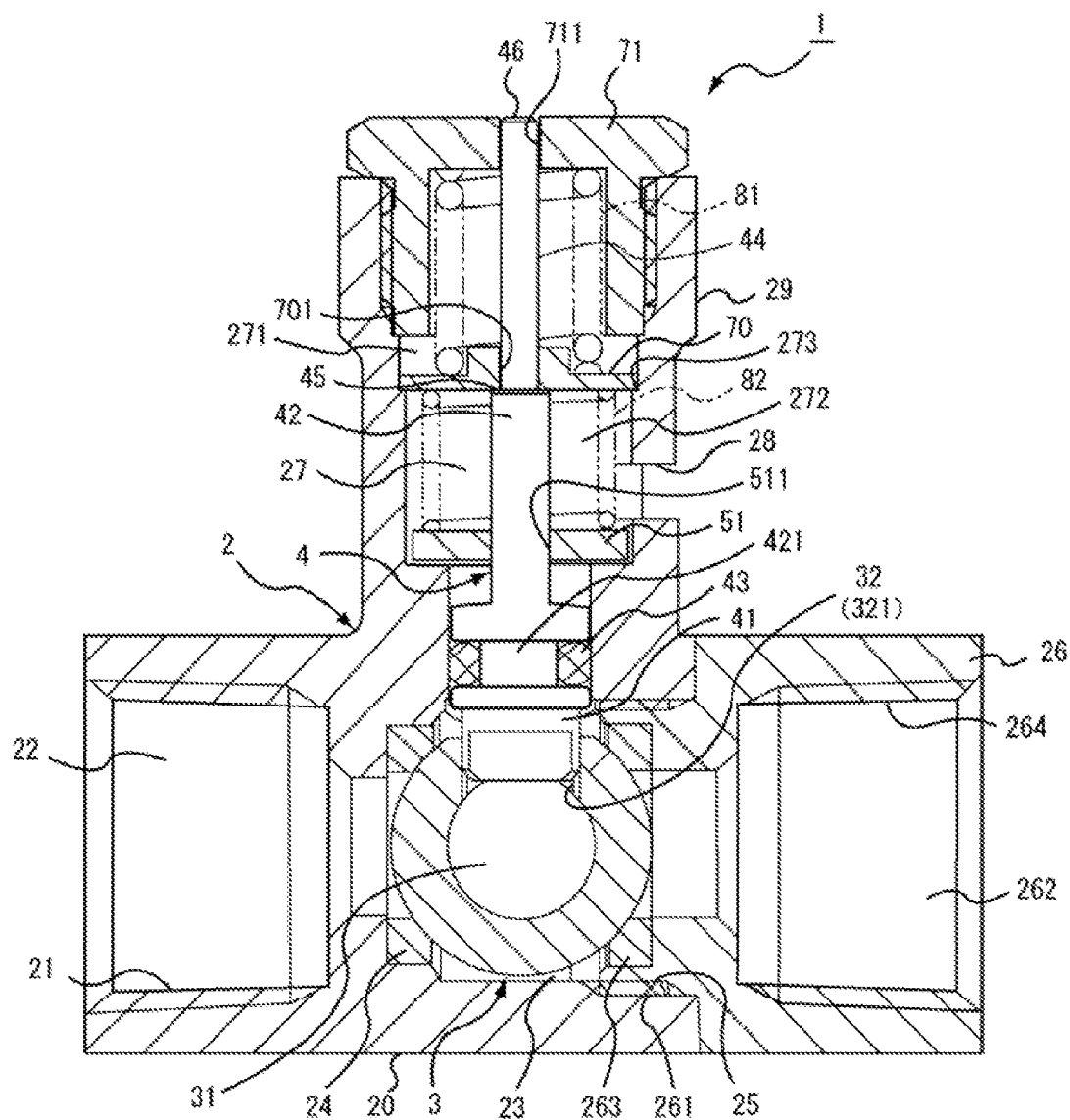
FIG. 6 is a cross-sectional side view of the operating valve of the second embodiment, in the closed state.
Figure 7:
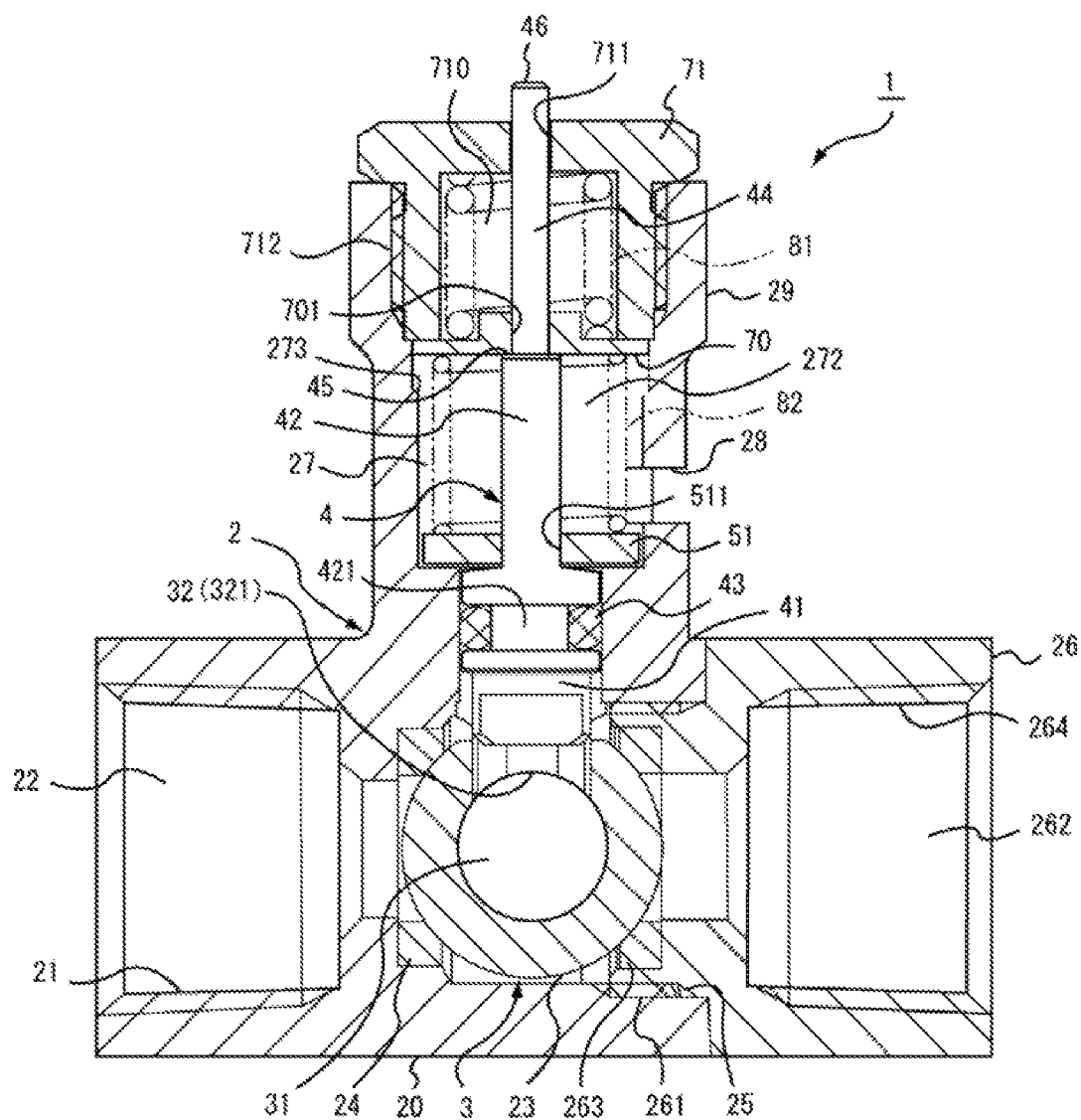
FIG. 7 is a cross-sectional side view of the operating valve of the second embodiment in the closed state, showing a situation where the rotary shaft has moved in the axial direction because of the expanded volume of the abnormal liquid present in the valve chamber due to freezing.
Figure 8:
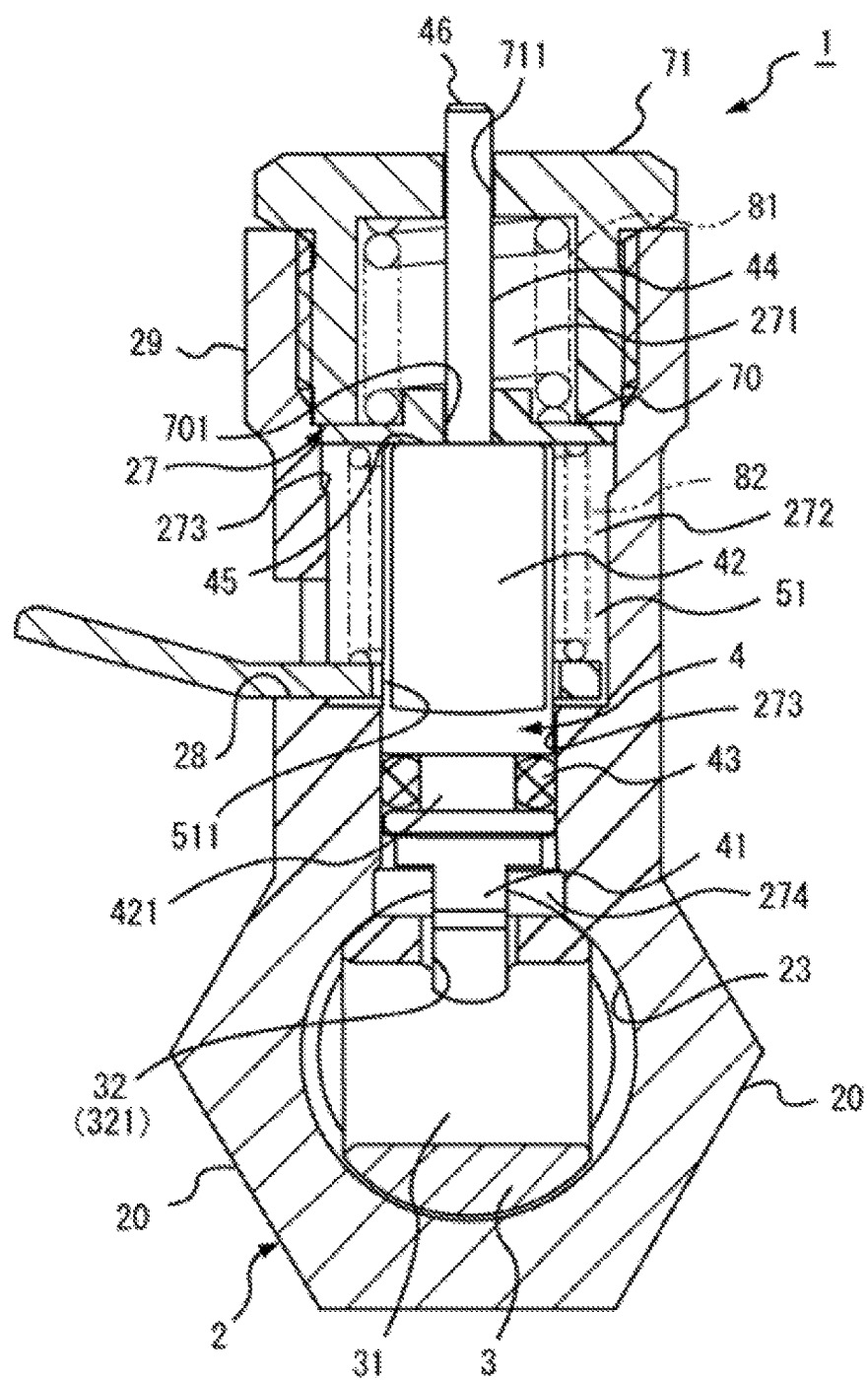
FIG. 8 is a cross-sectional front view of the operating valve of the second embodiment, in the closed state at the time of freezing.

Next, functions of the second embodiment of the present invention are explained. In the configuration of the second embodiment, an explanation on parts which are similar to the configuration of the first embodiment is omitted, and only different parts are explained. FIG. 6 is a cross-sectional side view of the operating valve of the second embodiment in the closed state. FIG. 7 is a cross-sectional side view of the operating valve of the second embodiment in the closed state, showing a situation where the rotary shaft has moved in the axial direction because of the expanded volume of abnormal liquid present in the valve chamber due to freezing. FIG. 8 is a cross-sectional front view of the operating valve of the second embodiment, in the closed state at the time of freezing.

A rotary shaft 42 has, in an order from the bottom, an engaging projection 41, a groove 421 formed in the circumferential direction to accommodate a sealing member 43, and a rectangular connecting part 42. Also, a cylindrical display unit 44 is connected at the tip of the connection part 42. The engagement projection 41, the groove 421, the connecting part 42, and the display unit 44 are located in a straight line on the same axis line, and are configured so as to be able to rotate around the axis line. A tip 46 of the display unit 44 reaches at the lid 71 which covers the top end of the holder 27. The tip 46 of the display unit 44 is housed in a hole 711 formed in the middle section of the lid 71 and has a configuration such that when abnormal liquid is not frozen, the tip 46 is stored inside the lid 711. In the case when abnormal liquid is frozen and the rotary shaft 4 is pushed up, the tip 46 will protrude from the hole 711. The display unit 44 may be configured as an integral body with the rotary shaft 4. However, there is no need to fix the display unit 44 to the rotating shaft 4, and as described below, the display unit 44 may also be a separated, display member.

The display unit or the display member is a means to give some visual change, which can be recognized from outside of the main body 2, when the position of the rotary shaft 4 moves by volumetric expansion due to freezing of abnormal liquid. As a means to show such a visual change, there are physical and chemical means. As a physical means, there are a display means by an electrical configuration, a display means by an optical configuration, and a display means by a mechanical configuration as described earlier, and the like. As an example of the electrical configuration, a configuration can be offered where a contact point is contacted by a movement of the rotary shaft 4 in the axial direction, and this causes a power supply circuit to turn on and to light up a light-emitting means such as a light-emitting diode, a bulb, and the like (or to switch another display device on). As an example of the optical configuration, a configuration using a spectroscope can be offered where an incident angle of light toward the spectroscope is changed according to the movement of the rotary shaft 4 in the axial direction, and a movement of the rotary shaft 4 can be notified by the changed colors obtained by the reflection spectrum obtained by reflection.

As an example of the chemical means, there is a method of using a pressure sensitive member whose surface color is changed depending on the amount of the applied pressure. Specifically, a configuration, where the lid 71 is configured from a transparent or semitransparent member, and the pressure sensitive member is inserted between the biasing member 8 and the lid 71, can be cited. When the rotary shaft 4 moves and the biasing member 8 is compressed, the pressure applied from the biasing member 8 to the pressure sensitive member increases and consequently, the color changes. By seeing the change of the color through the transparent lid 71, it is possible to know a movement of the rotary shaft 4. Alternatively, it is also possible to have a configuration where a spring receiving member 70 is to be a piston having airtightness, an airtight chamber is formed between the transparent lid 71 and the spring receiving member 70, and two gases that react, and have different color development from each other in the airtight chamber. In case where a chemical reaction involving the gases is in equilibrium in the airtight chamber by the change of the pressure applied from the biasing member 8 to the spring receiving member 70, if the pressure increases, the equilibrium moves in the direction of having the smaller molar amount of gas (in the direction of volume reduction). Consequently, the amount of one gas increases relatively, and the color of the entire gas will change to the color of the increased gas. Based on such a color change, it is possible to know the movement of the rotary shaft 4.

In the holder 27, in addition to the operating member 5 that is connected to the connecting part 42 of the rotary shaft 4, a first biasing member 81 and a second biasing member 82 are housed by arranging in a serial direction. The first biasing member 81 made from a compressed coil spring is disposed along the periphery of the display unit 44, and is housed inside the lid 71. The tip of the first biasing member 81 is in contact with the upper rear surface of the lid 71, and the base end of the first biasing member 81 is in contact with the spring receiving member 70. The spring receiving member 70, with the display unit 44 penetrating into a central communication hole 701, is joined to a stepped section 45 that is formed between the connecting part 42 and the display unit 44 of the rotary shaft 4. By joining the spring receiving member 70 to the stepped section 45, the biasing force of the first biasing member 81 will act as a force to bias the rotary shaft 4 in the direction of the valve body 3.

Further, the peripheral edge of the spring receiving member 70 is located in the vicinity of the inner wall of the holder 27. The spring receiving member 70 divides the holder 27 into a first holder 271 that holds the first biasing member 81, and a second holder 272 that holds the second biasing member 82. The inner peripheral diameter of the first holder 271 is formed so as to be larger than the inner peripheral diameter of the second holder 272, and a stepped section 273 due to the difference of these peripheral diameters is formed between the first holder 271 and the second holder 272.

The peripheral edge of the spring receiving member 70 is configured so as to be able to move between a state where the spring receiving member 70 is received from below by the stepped section 273, and a state where the stepped section 273 is received from the upper side by the bottom end of the lid 71. Because of the presence of the stepped section 273, the rotary shaft 4, which is biased in the direction of the valve body 3 by the first biasing member 81, is not biased too much to the valve body 3. The rotary shaft 4 is not biased beyond the normal connecting position with the valve body 3 (FIG. 6).

The second biasing member 82 is housed in the second holder 272. The second biasing member 82 is made from a compressed coil spring, and is disposed along the outer circumference of the connecting part 42. The tip of the second biasing member 82 is in contact with the bottom surface of the spring receiving member 70, and the base end of the second biasing member 82 is in contact with a base end portion 51 of the operating member 5. The operating member 5 is always biased in the downward direction by the second biasing member 82. The engaging recess 32 formed as a groove in the valve body 3 reaches the passage 31, and communicates with the passage 31. The engaging recess 32 itself functions as a connecting hole 321.

In such a configuration as above, if abnormal liquid present in the valve body 3 and the valve chamber 23 freezes in the closed state, the rotary shaft 4 is pushed in a direction so as to be away from the valve body 3 because the volume of the abnormal liquid expands due to freezing. The rotary shaft 4 moves by overcoming the biasing force from the first biasing member 81, and then the tip 46 of the display unit 44 protrudes to the outside of the lid 71. Due to the protrusion of the tip 46 of the display unit 44, it can be understood that the inside of the valve 1 is frozen.

If the frozen abnormal liquid melts, the abnormal liquid returns to its original volume. With the shrunk volume, the rotary shaft 4 moves to its original position by the biasing force of the first biasing member 81. Here, in the display unit 44, it is preferable that the surface color of the tip portion (the tip 46 and its vicinity) that is protruding outside is different from the exterior surface color of the lid 71. This is because the visual checking becomes easier. In particular, it is preferable that the combination of the surface color of the tip portion of the display unit 44 and the lid 71 is a combination of colors that are not adjacent in the color wheel. More preferably, the combination of the surface color of the tip portion of the display unit 44 and the lid 71 is a combination of colors of the opposing positions or colors of the vicinity of the opposing positions in the color wheel. The display means is configured by the display unit 44 and the hole 711 of the lid 71.

Figure 9:
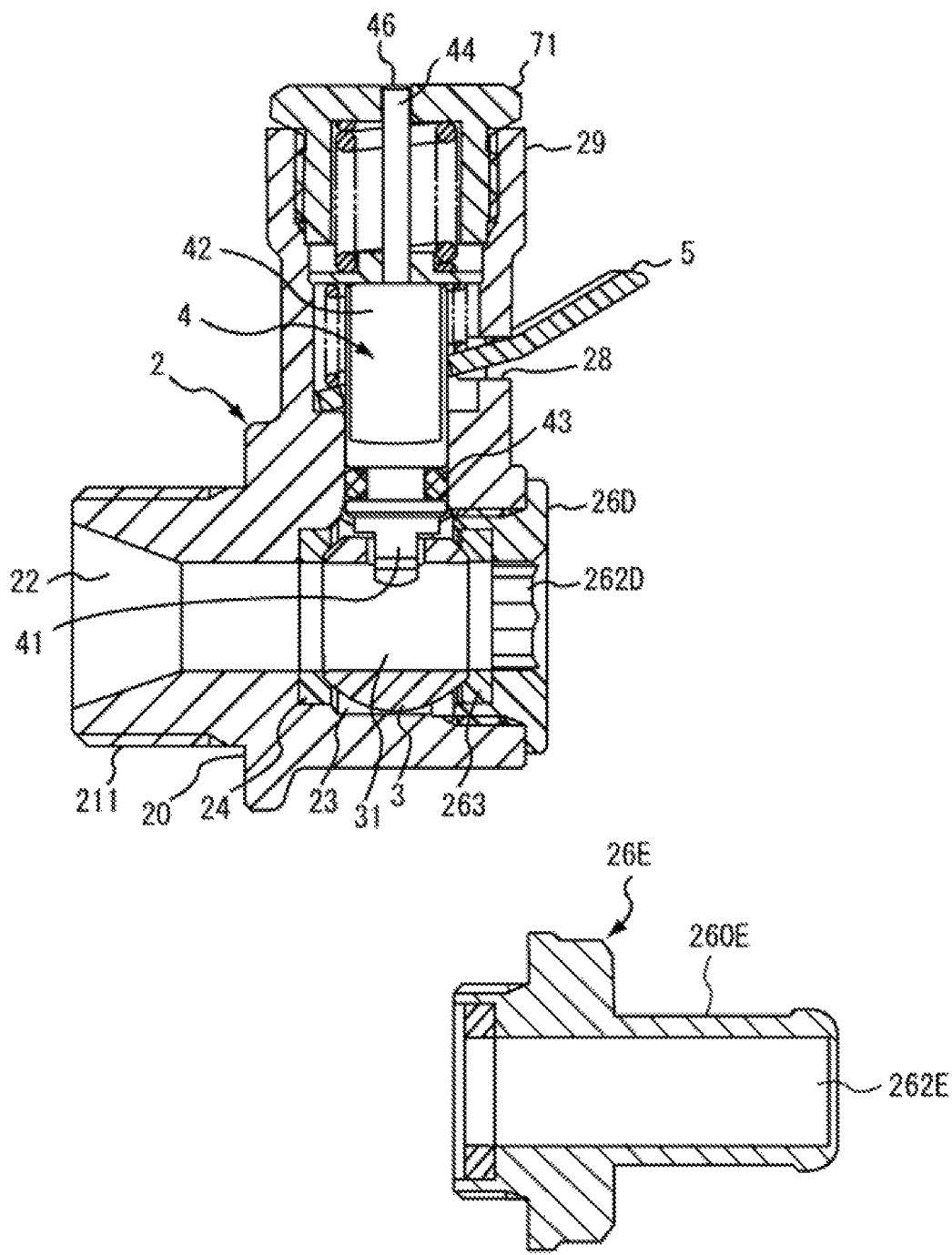
FIG. 9 is a cross-sectional side view of an operating valve of the third embodiment in the open state.

Next, functions of the third embodiment of the present invention are explained. Since the configuration of the third embodiment is almost the same as the configuration of the second embodiment described above, only different parts are explained. FIG. 9 illustrates a configuration where the lid member 26 is substituted with a lid member 26D that is not provided with a female threading 264 for connecting the passage tube. The lid member 26D has a passage 262D, and abnormal liquid is discharged from the passage 262D to the outside. The third embodiment which is connected to such a lid member 26D is used in case being connected to an end section of a passage or to an outlet of a container. Since such a connection position is often a position which generally contacts with the outside air, directly, freezing happens very frequently in the closed state, and it is advantageous to use the invention in such a position.

Further, as shown in FIG. 9, by substituting the lid member 26D with such a lid member 26E of a different shape, it is possible to connect to various types of external passages. In the example shown in FIG. 9, the lid member 26E is provided with a connection port 260E to connect to passages made from resin hoses, and a passage 262E communicating with the valve chamber 23 is provided in the connection port 260E.

Figure 10:
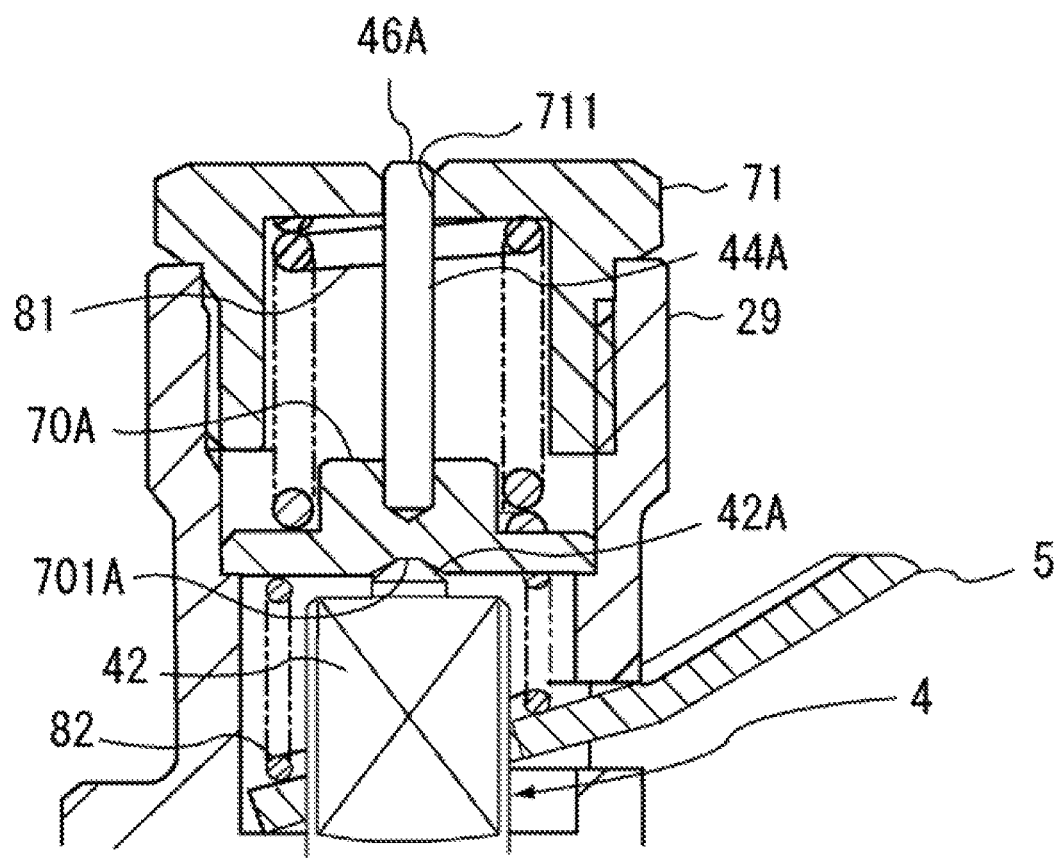
FIG. 10 is a cross-sectional side view of an operating valve of the fourth embodiment in the open state, showing another configuration of a display means.

Next, functions of the fourth embodiment of the present invention are explained. Since the configuration of the fourth embodiment is almost the same as the configuration of the second embodiment described above, only different parts are explained. As shown in FIG. 10, the display unit 44 in the rotary shaft 4 is divided into a separated member, and a connecting part 42 of the rotary shaft 4 and a display member 44A are disposed, through a spring receiving member 70A, so as to face from each other linearly on the same axis. Also, the base end of the display member 44A is fixed to the center of the spring receiving member 70A.

In such a configuration, the rotary shaft 4 and the display member 44A can move together in the axial direction as an integral unit. If the rotary shaft 4 moves in a direction away from the valve body 3 due to freezing, the tip 46A of the display member 44A will protrude to the outside from the lid 71. Further, a cylindrical projection 42a is formed on the rotational axis line at the tip of the connecting part 42, and is slidably engaged to a shaft receiving hole 701A formed at the center of the spring receiving member 70A. With such a configuration, the operation resistance against the sliding operation by the operating member 5 is reduced. The display means is configured by the display member 44A and the hole 711 of the lid 71.

Figure 11A:
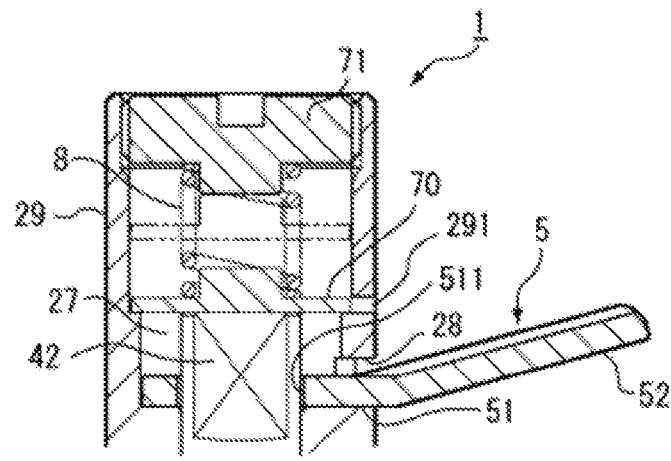
FIGS. 11A, 11B and 11C are cross-sectional side views of an operating valve of the fifth embodiment in the open state, showing another configuration of a display means.
Figure 11B:
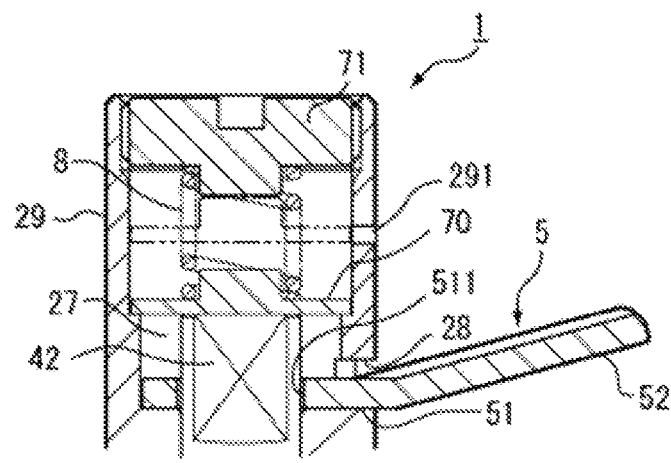
Figure 11C:
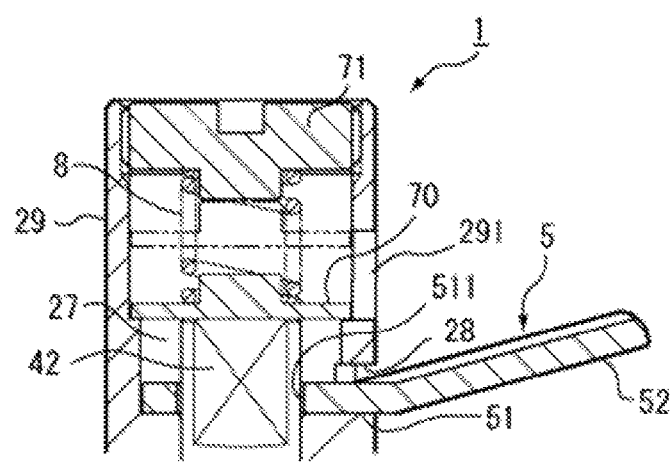

Next, functions of the fifth embodiment of the present invention are explained. Since the configuration of the fifth embodiment is almost the same as the configuration of the first embodiment described above, only different parts are different are explained. As shown in FIGS. 11A, 11B and 11C, in the holder main body 2, at a position corresponding to the position of the spring receiving member 70, a hole which penetrates the holder 27 to the outside is formed, and a window 291 is provided. The position of the spring receiving member 70 can be confirmed through the window 291. If the spring receiving member 70 moves in the upward direction, a freezing state can be confirmed. The size and the position of the window 291, as illustrated, can be suitably modified. For example, as shown in FIG. 11A, it is possible to have a configuration where the window 291 is provided at the position of the spring receiving member 70 in the non-freezing condition. This configuration enables to judge the freezing state if the spring receiving member 70 cannot be seen after its moving. On the contrary, as shown in FIG. 11B, it is possible to have a configuration where the window 291 is provided at the position of the spring receiving member 70 in the freezing condition. This configuration enables to judge the freezing state if the spring receiving member 70 can be seen after its moving. Alternatively, as shown in FIG. 11C, it is possible to have a configuration where the window 291 is configured by a long hole having a long side in the axial direction of the rotary shaft 4, and the window 291 is provided at a position that includes the moving range of the spring receiving member 70 so that the spring receiving member 70 is always be visual checked. It is also possible to check the position of the rotary shaft 4, rather than the position of the spring receiving member 70, by window 291. In particular, it becomes easier to do visual checking by having a configuration where a mark in the outer circumference of the rotary shaft 4 is provided so that the position of this mark is checked through the window 291. The display means is configured by such a window 291.

Next, functions of the sixth embodiment of the present invention are explained. Since the configuration of the sixth embodiment is almost the same as the configuration of the first embodiment described above, only different parts are explained.

Figure 12:
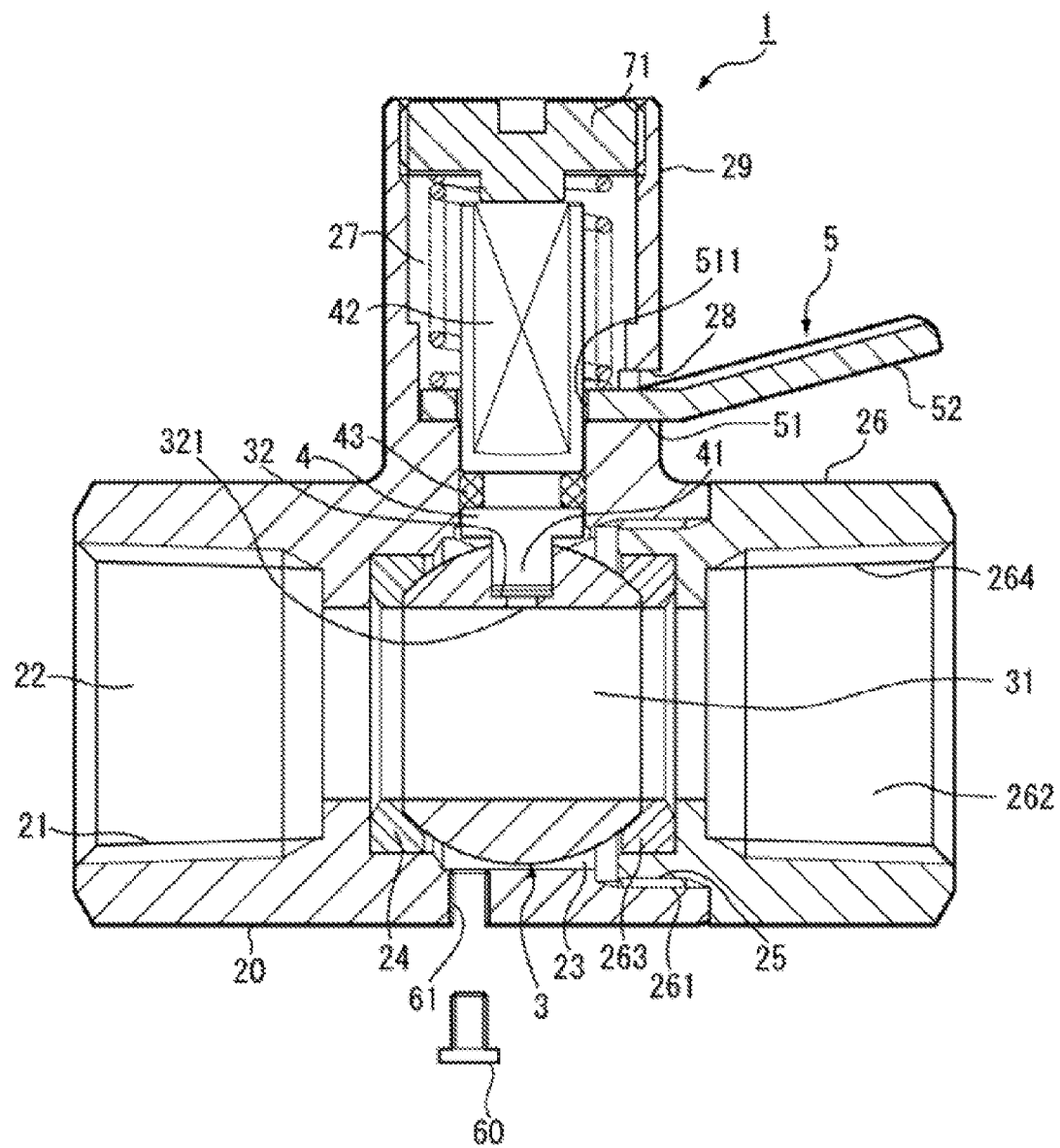
FIG. 12 is a cross-sectional side view of an operating valve of the sixth embodiment in the open state.
Figure 13:
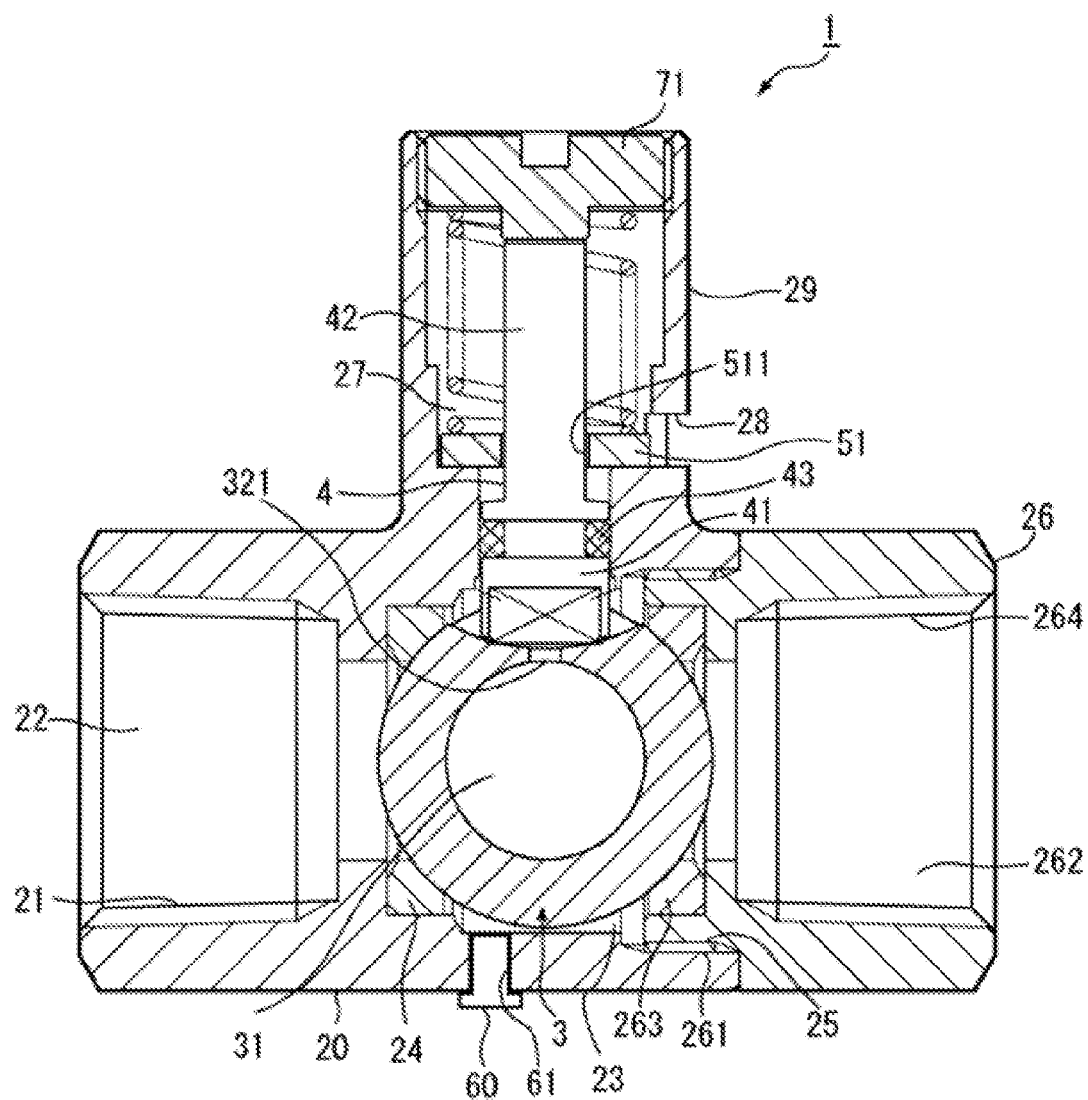
FIG. 13 is a cross-sectional side view of the operating valve of the sixth embodiment in the closed state.

FIG. 12 is the cross-sectional side view of the operating valve of the sixth embodiment in the open state. As shown in FIG. 12, a hole through which the valve chamber 23 can communicates with outside is provided in the main body 2. After assembling the operation valve 1, the valve body 3 is taken the open state, and resin is poured into the valve chamber 23 through the hole 61. The resin is filled in the space between the inner surface of the valve chamber 23 and valve body 3 except for the positions of the seal members 24 and 263. With this, it becomes possible to prevent abnormal liquid from entering the space between the valve body 3 and the inner surface of the valve chamber 23. Incidentally, as shown in FIG. 13, the hole 61 will be blocked by a plug 60.

Further, in the sixth embodiment, in the process of assembling, a urethane release agent may be also applied to the outer surface of the valve body 3. This enables to reduce a coefficient of friction of the contact surface between the surface of the valve body 3 and the resin. Accordingly, after filling the resin, the rotational operation of the valve body 3 becomes easier. In the sixth embodiment, if abnormal liquid freezes, the amount of the expanded volume of the liquid in the passage 31 can move to the inside of the valve chamber 23 through the connecting hole 321, and the amount of the expanded volume can be absorbed by the rise of the rotary shaft 4.

Moreover, even though this is different from the configuration shown in FIG. 12, in the sixth embodiment, it is also possible to omit the seal members 24 and 263, and to fill the sections of the seal members 24 and 263 by the resin.

Next, the seventh embodiment is explained. Since the configuration of the seventh embodiment is almost the same as the configuration of the first embodiment described above, only different parts are explained.

In the shapes of the seal members 24 and 263 of the first embodiment, as shown in FIG. 3, for example, in a state where the passage 22 of the main body 2 and the passage 31 of the valve body 3 are at an angle of 45°, the valve chamber 23 is not sealed. Therefore, the water present in the passage 22 of the main body 2 or in the passage 31 of the valve body 3 can enter the valve chamber 23 as shown in F and G (in a space between the inner surface of the valve chamber 23 and the valve body 3).

Figure 14:
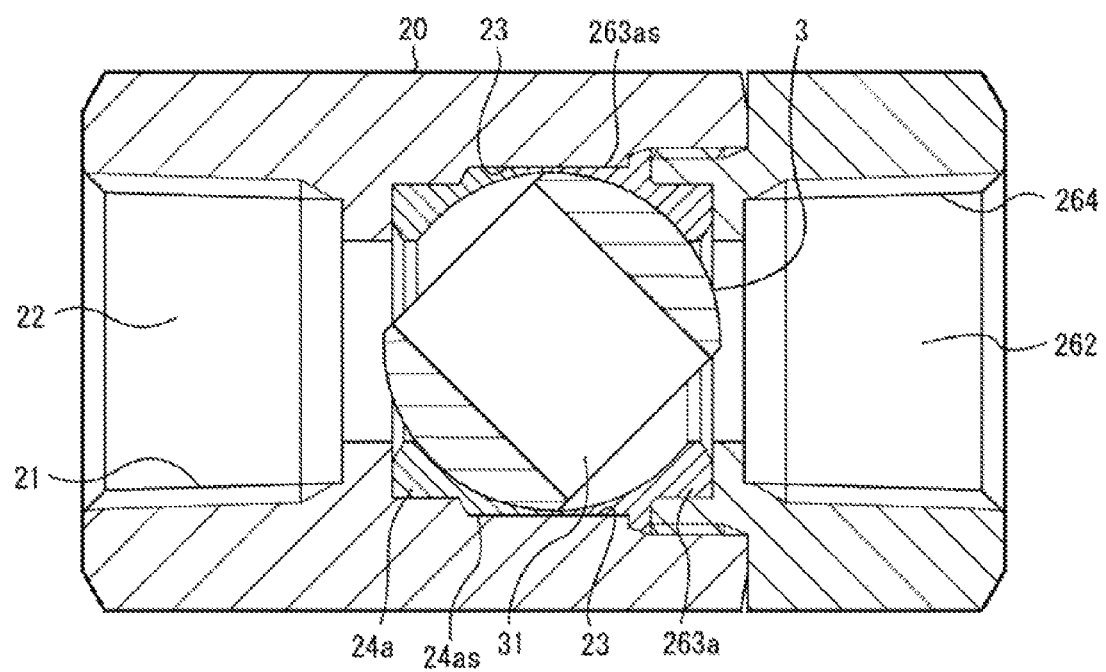
FIG. 14 is a plane cross-sectional view of the seventh embodiment.

In the seventh embodiment as shown in FIG. 14, the seal members 24 and 263 have the shapes to fill the space between the inner surface of the valve chamber 23 and the valve body 3. For example, a filling part 24as, which continues from the sealing section 24a of the seal member 24, has an inner shape having a hemispherical concave shape that is the same as the outside shape of the valve body 3, and has an outside shape which matches the insider dimension shape of the valve chamber 23. Similarly, the seal member 263 has a sealing section 263a, and a filling section 263as which continues from the sealing section 263a. The filling part 24as has an inner shape having a hemispherical concave shape that is the same as the outside shape of the valve body 3, and has an outside shape which matches the insider dimension shape of the valve chamber 23. By having this configuration, it becomes possible to prevent the water from entering the space between the valve body 3 and the inner side surface of the valve chamber 23.

In the operating valves of the sixth and the seventh embodiments, it is possible to have a configuration where the rotary shaft 4 cannot be detached from the valve body 3, which is different from the configuration of the first embodiment. This is because the pre-freezing volume of the liquid, whose volume increases due to freezing, is decreased by the presence of the filled resin or the seal members, and thus, the increase of volume by freezing is reduced. In this case, the connecting hole 321 may be omitted.

Incidentally, the operating valves of the embodiments described above were explained using water as an example of abnormal liquid; however, the present invention is not limited thereto, and as the abnormal liquid, for example, there are silicon, germanium, gallium, bismuth, and the like. In addition, there are mixed abnormal liquids with water and using, such as, pure fruit juices, non-concentrated juices, milk such as 100% raw milk, and the like. Furthermore, the opening/closing valve for abnormal liquid of the present invention is also available for the use being mounted to the passages as well as the cases of directly being mounted to abnormal liquid containers.

Although the operating member 5 has an operation lever, it is not necessary to have a lever. For example, by using a gear that is concentric with the rotary shaft 4, it is also possible to provide a configuration where the rotary shaft can be rotated by a drive gear or a rack meshing with this gear. The driving force in this case may be obtained from an actuator such as a motor, a piston, and the like.

What is claimed is:

1. A valve for abnormal liquid, comprising:
    a main body which includes a connecting part to be detachably mounted to a flow passageway of the abnormal liquid, and a passage communicating with the flow passageway of the abnormal liquid at the time of mounting;
    a valve chamber which is formed in the main body and has a hole corresponding to the passage;
    a valve body which is housed in the valve chamber and has a passage corresponding to the passage of the main body, the valve body performing switching operation by rotating with respect to the passage of the main body;
    a seal member which prevents the abnormal liquid that is present in the passage of the main body from entering the valve chamber when the passage of the valve body corresponds to the passage of the main body;
    a rotary shaft which is housed in the main body, the rotary shaft being connected to the valve body at least in a state where the abnormal liquid is not frozen, and being connected so as to be movable in an axial direction;
    an operating member which is connected to the rotary shaft in the main body and projects outside the main body, the operating member operating a rotation of the rotary shaft;
    a bias member which biases the rotary shaft to a position of the valve body;
    a connecting hole formed in the valve body, the connecting hole communicating with the passage in the valve body;
    an engaging projection formed at a base end of the rotary shaft, the engaging projection being engaged with the connecting hole, an entire surface of a base end of the engaging projection exposed to the passage in the valve body; and
    a display unit which displays a status of a freeze so as to be able to be checked from outside of the main body by displaying a movement of the rotary shaft.

2. A valve for abnormal liquid, comprising:
a main body which includes a connecting part detachably mounted to a flow passageway of the abnormal liquid, and a passage communicating with the flow passageway of the abnormal liquid at the time of mounting;
a valve chamber which is formed in the main body, the valve chamber having a hole corresponding to the passage and a hole communicating with an outside;
a valve body which is housed in the valve chamber and has a passage corresponding to the passage of the main body, the valve body performing switching operation by rotating with respect to the passage of the main body;
a rotary shaft which is connected to the valve body and housed in the main body; an operating member which is connected to the rotary shaft in the main body and projects outside the main body, the operating member operating a rotation of the rotary shaft;
a resin which is poured from the hole communicating with the outside into a space between an inner surface of the valve chamber and the valve body;
a connecting hole formed in the valve body, the connecting hole communicating with the passage in the valve body;
an engaging projection formed at a base end of the rotary shaft, the engaging projection being engaged with the connecting hole, an entire surface of a base end of the engaging projection exposed to the passage in the valve body; and
a display unit which displays a status of a freeze so as to be able to be checked from outside of the main body by displaying a movement of the rotary shaft.

3. The valve for abnormal liquid according to claim 2, wherein a release agent is applied to a surface of the valve body.

4. A valve for abnormal liquid, comprising:
a main body which includes a connecting part detachably mounted to a flow passageway of the abnormal liquid, and a passage communicating with the flow passageway of the abnormal liquid at the time of mounting;
a valve chamber which is formed in the main body and has a hole corresponding to the passage;
a valve body which is housed in the valve chamber and has a passage corresponding to the passage of the main body, the valve body performing switching operation by rotating with respect to the passage of the main body;
a rotary shaft which is connected to the valve body and housed in the main body; an operating member which is connected to the rotary shaft in the main body and projects outside the main body, the operating member operating a rotation of the rotary shaft;
a seal member which is formed to fill in a space between an inner surface of the valve chamber and the valve body, and which prevents the abnormal liquid present in the passage of the main body from entering the valve chamber;
a connecting hole formed in the valve body, the connecting hole communicating with the passage in the valve body;
an engaging projection formed at a base end of the rotary shaft, the engaging projection being engaged with the connecting hole, an entire surface of a base end of the engaging projection exposed to the passage in the valve body; and
a display unit which displays a status of a freeze so as to be able to be checked from outside of the main body by displaying a movement of the rotary shaft.

\* \* \* \* \*